(12) United States Patent
Schlosser et al.

(10) Patent No.: US 6,547,992 B1
(45) Date of Patent: Apr. 15, 2003

(54) FLAME RETARDANT COMBINATION FOR THERMOPLASTIC POLYMERS L

(75) Inventors: Elke Schlosser; Bernd Nass, both of Augsburg; Wolfgang Wanzke, Meitingen, all of (DE)

(73) Assignee: Clariant GmbH, Frankfurt (DE)

( * ) Notice: Subject to any disclaimer, the term of this patent is extended or adjusted under 35 U.S.C. 154(b) by 0 days.

(21) Appl. No.: 09/496,025

(22) Filed: Jan. 29, 2000

(30) Foreign Application Priority Data

Jan. 30, 1999 (DE) ......................................... 199 03 708
Dec. 15, 1999 (DE) ......................................... 199 60 671

(51) Int. Cl.⁷ ............................................. C09K 21/00
(52) U.S. Cl. ........................ 252/609; 524/133; 524/135
(58) Field of Search ................................ 524/133, 135; 252/609

(56) References Cited

U.S. PATENT DOCUMENTS

| | | | |
|---|---|---|---|
| 3,900,344 A | | 8/1975 | Racky et al. |
| 4,036,811 A | | 7/1977 | Noetzel et al. |
| 4,879,066 A | | 11/1989 | Crompton |
| 5,326,805 A | | 7/1994 | Sicken et al. |
| 5,780,534 A | | 7/1998 | Kliener et al. |
| 5,900,446 A | * | 5/1999 | Nishihara et al. ............ 524/127 |
| 6,207,736 B1 | | 3/2001 | Nass et al. |
| 6,270,560 B1 | * | 8/2001 | Kleiner .................... 106/18.14 |
| 6,365,071 B1 | * | 4/2002 | Jenewein .................... 252/609 |

FOREIGN PATENT DOCUMENTS

| | | | |
|---|---|---|---|
| DE | 195 06 330 A1 | | 8/1996 |
| DE | 197 34 437 | | 2/1999 |
| DE | 197 37 727 | | 2/1999 |
| EP | 0 106 248 A2 | | 4/1984 |
| EP | 0 180 795 B1 | | 5/1986 |
| EP | 0 584 567 | | 3/1994 |
| EP | 0 699 708 | | 3/1996 |
| GB | 2121056 | | 12/1983 |
| WO | 9739053 | * | 10/1997 |
| WO | WO 97/390053 | | 11/1997 |
| WO | 9839381 | * | 9/1998 |
| WO | WO/98/45364 | | 10/1998 |

OTHER PUBLICATIONS

Front page of DE 2 252 258 see AA Above May 9, 1974.
Front page of DE 24 47 727 see AB Above Apr. 8, 1976.
Abstract and U.S. Application 09/129,051 Aug. 4, 1998.
Abstract and U.S. Application 09/141,039 Aug. 27, 1998.
Front page of EP 0 287 293 see AC above Oct. 19, 1988.

Ullmann's Encyclopedia of Industial Chemistry, 5ᵗʰ Edidtion, vol. A12 (1998), pp. 372–387 and 443–448.
Commercial Ceramic Clays, vol. A6 (1986), pp. 12–18.
Translation of "DE 197 37 727".
Hans Dominghaus, Die Kunststoffe und ihre Eighenschaften, 5ᵗʰ Edition, p. 14, 1998.
Walter de Gruyter, Riedel in Anorganische Chemie, 2ⁿᵈ Edition, pp. 490–497, 1990.
U.S. App. 09/496,023, Schlosser et al., filed Jan. 29, 2000.
U.S. App. 09/491,321, Horold, filed Jan. 25, 2000.
U.S. App. 09/141,039, Jenewein et al., filed Aug. 27, 1998.
U.S. App. 08/920,305, Horold et al., filed Aug. 28, 1997.
Hans Dominghaus, Die Kunststoffe und ihre Eighenschaften, 5th Ed., p. 14, 1998 (copy provided in IDS dated Jun. 11, 2001.
Walter de Gruyter, Riedel in Anorganische Chemie, 2nd Ed., pp. 490–497, 1990 (copy provided in IDS dated Jun. 11, 2001.
Murphy, John, The Additives for Plastics Handbook, Elsevier Science Ltd., pp. 141–142; 1996.*

* cited by examiner

Primary Examiner—Cephia D. Toomer
(74) Attorney, Agent, or Firm—Anthony A. Bisulca

(57) ABSTRACT

The invention relates to a flame retardant combination for thermoplastic polymers comprising, as component A, a phosphinate of the formula (I) and/or a diphosphinate of the formula (II) and/or polymers of these

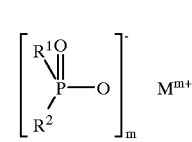

(I)

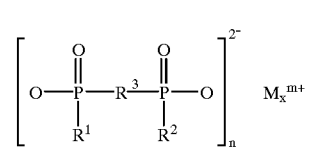

(II)

where
$R_1$ and $R^2$ are identical or different and are $C_1$–$C_6$-alkyl, linear or branched, and/or aryl;
$R^3$ is $C_1$–$C_{10}$-alkylene, linear or branched, $C_6$–$C_{10}$-arylene, -alkylarylene or -arylalkylene;
M are calcium ions, aluminum ions and/or zinc ions;
m is 2 or 3;
n is 1 or 3;
x is 1 or 2,
and, as component B, a synthetic inorganic compound and/or a mineral product.

16 Claims, No Drawings

FLAME RETARDANT COMBINATION FOR THERMOPLASTIC POLYMERS L

FIELD OF THE INVENTION

The invention relates to a flame retardant combination for thermoplastic polymers.

DESCRIPTION OF THE RELATED ART

The salts of phosphinic acids (phosphinates) have proven to be effective flame-retardant additives for thermoplastic polymers. This applies both to the alkali metal salts (DE-A-2 252 258) and to the salts of other metals (DE-A-2 447 727).

Calcium phosphinates and aluminum phosphinates have been described as particularly effective in polyesters and give less impairment of the material properties of the polymeric molding compositions than do the alkali metal salts (EP-A-0 699 708).

Synergistic combinations of the phosphinates mentioned with certain nitrogen-containing compounds have also been found, and in a large number of polymers these are more effective flame retardants than the phosphinates alone (PCT/EP97/01664, and also DE-A-197 34 437 and DE-A-197 37 727).

SUMMARY OF THE INVENTION

Surprisingly, it has now been found that the flame-retardant effect of the various phosphinates in thermoplastic polymers can also be markedly improved by adding small amounts of inorganic and/or mineral compounds which do not contain nitrogen.

It has moreover been found that the additives mentioned can also improve the flame-retardant effect of phosphinates in combination with nitrogen-containing synergists.

The invention therefore provides a flame retardant combination for thermoplastic polymers comprises, as component A, a phosphinate of the formula (I) and/or a diphosphinate of the formula (II) and/or polymers of these $$\begin{bmatrix} R^1O \\ \diagdown \\ P-O \\ \diagup \\ R^2 \end{bmatrix}_m M^{m+} \quad (I)$$

$$\begin{bmatrix} O & O \\ \| & \| \\ O-P-R^3-P-O \\ | & | \\ R^1 & R^2 \end{bmatrix}_n^{2-} M_x^{m+} \quad (II)$$

where
$R^1$ and $R^2$ are identical or different and are $C_1$–$C_6$-alkyl, linear or branched, and/or aryl;
$R^3$ is $C_1$–$C_{10}$-alkylene, linear or branched, $C_6$–$C_{10}$-arylene, -alkylarylene or -arylalkylene;
M are calcium ions, aluminum ions and/or zinc ions;
m is 2 or 3;
n is 1 or 3;
x is 1 or 2,
and, as component B, a synthetic inorganic compound and/or a mineral product.

DESCRIPTION OF THE PREFERRED EMBODIMENTS $R^1$ and $R^2$ are identical or different and are preferably $C_1$–$C_6$-alkyl, linear or branched, and/or phenyl.

$R^1$ and $R^2$ are identical or different and are particularly preferably methyl, ethyl, n-propyl, isopropyl, n-butyl, tert-butyl, n-pentyl and/or phenyl.

$R^3$ is preferably methylene, ethylene, n-propylene, isopropylene, n-butylene, tert-butylene, n-pentylene, n-octylene or n-dodecylene.

Other preferred meanings for $R^3$ are phenylene and naphthylene.

Other preferred meanings for $R^3$ are methylphenylene, ethylphenylene, tert-butylphenylene, methyinaphthylene, ethyinaphthylene and tert-butylnaphthylene.

Other preferred meanings for $R^3$ are phenylmethylene, phenylethylene, phenylpropylene and phenylbutylene.

Component B is preferably an oxygen compound of silicon, a magnesium compound, a metal carbonate of metals of the second main group of the periodic table, red phosphorus, a zinc compound or an aluminum compound.

The oxygen compounds of silicon are preferably salts or esters of orthosilicic acid and condensation products thereof, silicates, zeolites, silicas, glass powders, glass-ceramic powders or ceramic powders.

The magnesium compounds are preferably magnesium hydroxide, hydrotalcites, magnesium carbonates or magnesium calcium carbonates.

The red phosphorus is preferably elemental red phosphorus or a preparation in which the surface of the phosphorus has been coated with low-molecular-weight liquid substances, such as silicone oil, paraffin oil or esters of phthalic acid or adipic acid, or with polymeric or oligomeric compounds, e.g. with phenolic resins or amino plastics, or else with polyurethanes.

The zinc compounds are preferably zinc oxide, zinc stannate, zinc hydroxystannate, zinc phosphate, zinc borate or zinc sulfides.

The aluminum compounds are preferably aluminum hydroxide or aluminum phosphate.

The novel flame retardant combination preferably comprises nitrogen compounds, as further component C.

The nitrogen compounds preferably have the formulae (III) to (VIII) or are mixtures of these (III)

(IV)

(V)

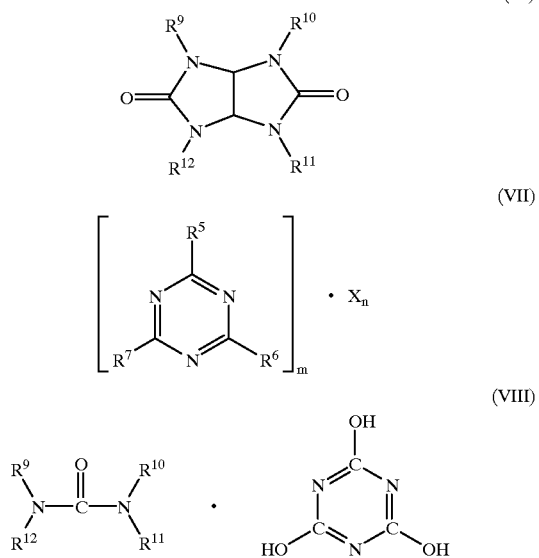

where
R[5] to R[7] are hydrogen, $C_1$–$C_8$-alkyl, $C_5$–$C_{16}$-cycloalkyl or -alkylcycloalkyl, unsubstituted or substituted with a hydroxyl function or with a $C_1$–$C_4$-hydroxyalkyl function, $C_2$–$C_8$-alkenyl, $C_2$–$C_8$-alkoxy, -acyl or -acyloxy, $C_6$–$C_{12}$-aryl or -arylalkyl, —OR[8] or —N(R[8])R[9], or else N-alicyclic or N-aromatic systems, R[8] is hydrogen, $C_1$–$C_8$-alkyl, $C_5$–$C_{16}$-cycloalkyl or -alkylcycloalkyl, unsubstituted or substituted with a hydroxyl function or with a $C_1$–$C_4$-hydroxyalkyl function, $C_2$–$C_8$-alkenyl, $C_1$–$C_8$-alkoxy, -acyl or -acyloxy, or $C_6$–$C_{12}$-aryl or -arylalkyl, R[9] to R[13] are groups identical with R[8] or else —O—R[8], m and n, independently of one another, are 1, 2, 3 or 4, X are acids which can form adducts with triazine compounds (III); or the nitrogen compounds are esters of tris (hydroxyethyl) isocyanurate with aromatic polycarboxylic acids or are nitrogen-containing phosphates of the formula $(NH_4)_y H_{3-y} PO_4$ or $(NH_4 PO_3)_z$, where y is from 1 to 3 and z is from 1 to 10,000.

Component C is preferably benzoguanamine, tris (hydroxyethyl) isocyanurate, allantoin, glycouril, melamine, melamine cyanurate, melamine phosphate, dimelamine phosphate and/or melamine pyrophosphate.

The invention further provides the use of the novel flame retardant combination for rendering thermoplastic polymers flame-retardant. For the purposes of the present invention and as set out by Hans Dominghaus in "Die Kunststoffe und ihre Eigenschaften" [Plastics and their Properties], 5th edition (1998), p. 14, thermoplastic polymers are polymers in which the molecular chains have no lateral branching or else have varying numbers of lateral branches of different lengths, soften on heating and can be shaped in virtually any way desired.

The thermoplastic polymers are preferably Hi (high-impact) polystyrene, polyphenylene ethers, polyamides, polyesters, polycarbonates or blends or polymer blends of ABS (acrylonitrile-butadiene-styrene) type or of PC/ABS (polycarbonate/acrylonitrile-butadiene-styrene) type. Hi polystyrene is a poly-styrene with increased impact strength.

Particularly preferred thermoplastic polymers are polyamides, polyesters and ABS.

The term plastic molding compositions is used below for thermoplastic polymers which comprise the novel flame retardant combinations and, if desired, fillers and reinforcing materials and/or other additives as defined below.

For the use mentioned it is preferable to use, independently of one another, component A at a concentration of from 1 to 30% by weight and component B at a concentration of from 0.1 to 10% by weight, based in each case on the plastic molding composition.

Finally, the invention also provides a flame-retardant plastic molding composition comprising the novel flame retardant combination.

The polymers in the flame-retardant plastic molding composition are preferably polyamide, polyester or ABS.

The component B which has been mentioned earlier is a synthetic inorganic compound and/or a mineral product selected from the groups mentioned below:

Oxygen compounds of silicon, such as salts or esters of orthosilicic acid and condensation products thereof (silicates). An overview of suitable silicates is given, for example, by Riedel in Anorganische Chemie, 2nd edn., p. 490497, Walter de Gruyter, Berlin—N.Y. 1990. Of particular interest here are phyllosilicates (laminar or layer silicates) such as talc, kaolinite and mica, and the group comprising the bentonites and montmorillonites, and also tectosilicates, e.g. the group comprising the zeolites. Besides these, it is also possible to use silicon dioxide in the form of finely dispersed silica.

The silica here may have been prepared pyrogenically or by a wet chemical process. The silicates and silicas mentioned may have been provided with organic modifiers in order to achieve certain surface properties.

Other components B which may be used are glass powders, glass-ceramic powders and ceramic powders with a variety of makeups, e.g. as described in "Ullmann's Encyclopedia of Industrial Chemistry," 5th edition, Vol. A 12 (1989), pp. 372–387 (Glass) and pp. 443–448 (Glass-ceramics). Appropriate ceramic materials are described in Vol. 6 (1986) on pp. 12–18 (Commercial Ceramic Clays). It is possible to use either glasses and/or ceramics with defined melting points or else mixtures of products with a broad melting range, such as ceramic frits as used for preparing glazes. Frits of this type, or mixtures of two or more frits, may also comprise glass fibers, basalt fibers or ceramic fibers. Mixtures of this type are described, for example, in EP 0 287 293 B1.

Other compounds which may be used as component B are magnesium compounds, such as magnesium hydroxide, or also hydrotalcites of the formula

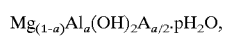

where

A is an anion $SO_4^{2-}$ or $CO_3^{2-}$, a is greater than 0 and equal to or less than 0.5, and p is the number of water molecules in the hydrotalcite and is from 0 to 1.

Preference is given to hydrotalcites in which A is the anion $CO_3^{2-}$ and $0.2 \leq a \leq 0.4$.

The hydrotalcites may be either naturally occurring hydrotalcites, which may, if desired, have been modified by an appropriate chemical treatment, or synthetically prepared products.

Other compounds which may be used as component B are metal carbonates of metals of the second main group of the periodic table and mixtures of these.

Suitable compounds are magnesium calcium carbonates ($b_1$) of the formula $$Mg_b Ca_c (CO_3)_{b+c} \cdot q\ H_2O,$$

where b and c are numbers from 1 to 5 and $b/c \geq 1$ and $q \geq 0$, and basic magnesium carbonates ($b_2$) of the formula $$Mg_d (CO_3)_e (OH)_{2d-2e} \cdot r\ H_2O,$$

where d is a number from 1 to 6 and e is a number greater than 0 and smaller than 6 and $d/e > 1$ and $r \geq 0$.

Particularly suitable mixtures are those made from $b_1$ and $b_2$, where the ratio of amounts $b_1:b_2$ is in the range from 1:1 to 3:1.

The magnesium calcium carbonates $b_1$ and basic magnesium carbonates $b_2$ may be used either in hydrated or anhydrous form, with or without surface treatment. These types of compound include the naturally occurring minerals, such as huntite ($b_1$) and hydromagnesite ($b_2$) and mixtures of these.

Other compounds which may be used as component B are zinc compounds, such as zinc oxide, zinc stannate, zinc hydroxystannate, zinc phosphates and zinc sulfides, and also zinc borates of the formula $f\ ZnO \cdot g\ B_2O_3 \cdot h\ H_2O$, where f, g and h are from 0 to 14.

If desired, the novel flame retardant combinations may comprise, as component C, a nitrogen compound of the formulae (III) to (VIII) or a mixture of the compounds indicated by the formulae and described in DE-A-1 97 37 727, which is expressly incorporated herein by way of reference.

In addition to the abovementioned, components C which may be used are oligomeric esters of tris(hydroxyethyl) isocyanurate with aromatic polycarboxylic acids, as described in EP-A 584 567, and nitrogen-containing phosphates of the formula $(NH_4)_y H_{3-y} PO_4$ or $(NH_4 PO_3)_z$, where y may be from 1 to 3 and z is any desired number (for example from 1 to 10,000), typically also given as an average of a chain length distribution.

Suitable polymers in which the novel flame retardant combination can be used effectively are also described on pages 6 to 9 of International Patent Application PCT/WO 97/01664, which is expressly incorporated herein by way of reference.

The term "phosphinate" below includes salts of phosphinic and diphosphinic acids and polymers of these.

The phosphinates, which are used in an aqueous medium, are essentially monomeric compounds. Depending on the reaction conditions polymeric phosphinates may also arise occasionally.

Examples of phosphinic acids which are suitable constituents of the phosphinates are:

dimethylphosphinic acid, ethylimethyphosphinic acid, diethylphosphinic acid, methyl-n-propylphosphinic acid, methanedi(methylphosphinic acid), benzene-1,4-(dimethylphosphinic acid), methylphenylphosphinic acid and diphenylphosphinic acid.

The phosphinates according to the invention may be prepared by known methods, as described in more detail, for example, in EP-A-699 708. The phosphinic acids here are reacted, for example, in aqueous solution with metal carbonates, metal hydroxides or metal oxides.

The amount of the phosphinate to be added to the polymers may vary within wide limits. The amount generally used is from 1 to 30% by weight, based on the plastic molding composition. The ideal amount depends on the nature of the polymer, on the nature of component B and, if used, C, and on the type of the phosphinate itself which is used. From 3 to 25% by weight is preferred, in particular from 5 to 20% by weight, based on the plastic molding composition.

The abovementioned phosphinates may be used in various physical forms in the novel flame retardant combination, depending on the type of polymer used and on the properties desired. For example, to achieve better dispersion in the polymer the phosphinates may be ground into a finely divided form. It is also possible, if desired, to use mixtures of different phosphinates.

The phosphinates according to the invention are thermally stable, and neither cause decomposition of the polymers during processing nor affect the plastic molding composition during the production process. The phosphinates are involatile under the usual conditions for preparing and processing thermoplastic polymers.

The amount of the inorganic compounds according to the invention (component B) to be added to the polymers may vary within wide limits. The amount used is generally from 0.1 to 10% by weight, based on the plastic molding composition. The ideal amount depends on the nature of the polymer, on the nature of the phosphinate (component A) used, on any nitrogen-containing compound (component C) used, and also on the type of the inorganic compound itself. From 0.3 to 7% by weight is preferred, in particular from 0.5 to 5% by weight. It is also possible to use a combination of the inorganic compounds mentioned.

The amount of nitrogen compound (component C) to be added to the polymers may vary within wide limits. The amount generally used is from 1 to 30% by weight, based on the plastic molding composition. The ideal amount depends on the nature of the polymer, on the nature of the phosphinate (component A) used, on the nature of the inorganic compound (component B) used, and also on the nature of the nitrogen compound itself. From 3 to 20% by weight is preferred, in particular from 5 to 15% by weight.

The flame-retardant components A and B and, if desired, C may be incorporated into thermoplastic polymers by, for example, premixing all of the constituents in powder and/or pellet form in a mixer and then homogenizing these in the polymer melt in a compounding apparatus (e.g. a twin-screw extruder). The melt is usually taken off as an extrudate, cooled and pelletized.

The components A, B (and C if used) may also be introduced separately via a metering system directly into the compounding apparatus.

It is also possible to admix the flame-retardant additives A, B and C with previously produced polymer pellets or polymer powder and to process the mixture directly on an injection molding machine to give moldings.

In the case of polyesters, for example, the flame-retardant additives A, B and C may also be added to the polyester melt straight away during the polycondensation.

Besides the novel flame retardant combination made from A, B and, if used, C, fillers and reinforcing materials may also be added to the molding compositions, for example glass fibers, glass beads, or minerals, such as chalk. The molding compositions may also comprise other additives, such as antioxidants, light stabilizers, lubricants, colorants, nucleating agents or antistats. EP-A-584 567 gives examples of the additives which can be used.

The flame-retardant plastic molding compositions are suitable for producing moldings, films, filaments and fibers, e.g. by injection molding, extrusion or pressing.

EXAMPLES

1. Components Used

Commercially available polymers (pellets):

ABS: ®Novodur P2X (Bayer AG, Germany) comprises no fillers or reinforcing materials.

Nylon-6 ®Durethan BKV 30 (Bayer AG, Germany) (glass-reinforced nylon-6): comprises 30% of glass fibers Polybutylene ®Celanex 2300 GV 1/30 (Hoechst ®Celanese USA) comprises 30% of glass fibers terephthalate: (glass-reinforced PBT):

Flame retardant components (pulverulent):

Component A

Aluminum diethylphosphinate, termed DEPAL below
Zinc diethylphosphinate, termed DEPZn below.

Component B

Aluminum phosphate, Riedel de Haen, DE
CEEPREE® Microfine, Brunner Mond & Co. Ltd., UK
DHT-4A (dihydrotalcite) Kyowa Chemical Industry, JP
DHT Exm 697-2 (dihydrotalcite), Süd-Chemie AG, DE
Exolit® RP 605 (red phosphorus), Clariant GmbH, DE
FIREBRAKE® ZB (zinc borate), US Borax & Chemical Corporation, USA
Martinal OL 104 (aluminum hydroxide), Martinswerke, DE
Securoc® C ION (huntite/hydromagnesite), Incemin AG, CH
Zinc oxide, MERCK, DE
Zinc stannate, Storey & Co., UK

Component C

Melamine Grade 003 (melamine), DSM, NL
Melapur® MC (melamine cyanurate), DSM Melapur, NL
Melapur® MP (melamine phosphate), DSM Melapur, NL

2. Preparation, Processing and Testing of Flame-retardant Plastic Molding Compositions The flame retardant components were mixed with the polymer pellets and any additives, in the ratios given in the tables, and incorporated in a twin-screw extruder (Leistritz LSM 30/34) at temperatures of from 190 to 225° C. (ABS) or from 230 to 260° C. (glass-reinforced PBT) or from 240 to 280° C. (glass-reinforced nylon-6). The homogenized polymer extrudate was taken off, cooled in a water bath and then pelletized.

After sufficient drying, the molding compositions were injection molded (Toshiba IS 100 EN) at melt temperatures of from 210 to 240° C. (ABS) or from 240 to 270° C. (glass-reinforced PBT) or from 260 to 280° C. (glass-reinforced nylon-6) to give test specimens and tested and classified for flame retardancy using the UL 94 test (Underwriters Laboratories). The combustibility of the test specimens was assessed by determining the oxygen index (LO) in accordance with ASTM D 2863-77).

Table 1 shows comparative examples in which aluminum diethylphosphinate or zinc diethylphosphinate (respectively DEPAL and DEPZn) were tested as sole flame retardant components in glass-fiber-reinforced PBT, nylon and ABS, respectively.

Table 2 shows comparative examples with nitrogen-containing compounds (component C) alone or, respectively, in combination with small amounts of effective compounds (component B) in glass-fiber-reinforced PBT and ABS, respectively.

Table 3 shows comparative examples in which aluminum diethylphosphinate or zinc diethylphosphinate were tested in combination with nitrogen-containing synergists in glass-fiber-reinforced PBT and PA, respectively, as defined in PCT/WO 97/01664.

The results of the examples in which the novel flame retardant combination was used are listed in Tables 4 to 8. All of the amounts given are in % by weight and are based on the plastic molding composition including the flame retardant combination.

It is apparent from the examples that the additives according to the invention (component B) combined with metal phosphinates bring about a significant increase in flame retardancy, if admixed in appropriate amounts. There is also a considerable improvement to the flame-retardant effectiveness of synergistic combinations made from the metal phosphinates and nitrogen-containing compounds (components A+C) when a certain amount of component B is added.

The amount of flame retardant needed, based on the plastic molding composition, to achieve V–0, V–1 and, respectively, V–2 classification can be reduced when the combination A+B is used, compared with A on its own and respectively when A+B+C is used, compared with A+C. In addition, for the same amount of flame retardant, based on the plastic molding composition, the novel combination gives a higher oxygen index (LOI) than in the comparative examples.

TABLE 1

Comparative examples. Phosphinates in glass-fiber-reinforced PBT and nylon and, respectively, in ABS

| Polymer | DEPAL [%] | DEPZn [%] | UL 94 classification(1.6 mm) | LOI [% $O_2$] |
|---|---|---|---|---|
| GRPBT | 15 | | V-1 | |
| GRPBT | 17 | | V-1 | |
| GRPBT | 20 | | V-0 | |
| GRPBT | | 20 | V-2 | 29.0 |
| GRPBT | | 25 | V-2 | 29.5 |
| GR nylon-6 | 20 | | V-2 | 33.5 |
| GR nylon-6,6 | 20 | | n.c.* | |
| GR nylon-6,6 | 25 | | n.c.* | |
| GR nylon-6,6 | 30 | | V-2 | 25.5 |
| ABS | 26 | | n.c.* | 33.0 |
| ABS | 30 | | n.c.* | 37.5 |

*n.c. = not classifiable

TABLE 2

Comparative examples. Nitrogen-containing compounds on their own and respectively, combined with compounds effective in small amounts in glass-fiber-reinforced PBT and in ABS, respectively.

| Polymer | Melamine cyanurate [%] | Melamine phosphate [%] | RP 605 | UL 94 classification (1.6 mm) | LOI [% $O_2$] |
|---|---|---|---|---|---|
| GRBPT | 20 | | | n.c.* | 23.5 |
| GRBPT | | 20 | | n.c.* | 25.0 |
| GRBPT | | 15 | 3 | V-2 | 26.0 |
| ABS | 30 | | | n.c.* | 21.0 |
| ABS | | 30 | | n.c.* | 21.5 |

*n.c. = not classifiable

TABLE 3

Comparative examples. Phosphinates combined with nitrogen-containing synergists in glass-fiber-reinforced PBT, nylon-6 and nylon-6,6 respectively.

| Polymer | DEPAL [%] | DEPZn [%] | Melamine cyanurate [%] | Melamine phosphate [%] | UL 94 classification (1.6 mm) | LOI [% O$_2$] |
|---|---|---|---|---|---|---|
| GRBPT | 8 | | 8 | | V-2 | |
| GRBPT | 10 | | 5 | | V-1 | 37.5 |
| GRBPT | 10 | | 10 | | V-0 | 40.0 |
| GRBPT | | 10 | 10 | | V-2 | 27.0 |
| GR nylon-6 | 10 | | | 10 | V-1 | 35.0 |
| GR nylon-6,6 | 20 | | 10 | | n.c.* | |

*n.c. = not classifiable

TABLE 4

Inventive. Phosphinates combined with compounds effective in small amounts in glass-fiber-reinforced PBT.

| DEPAL [%] | DEPZn [%] | Ceepree [%] | DHT Exm [%] | Zinc borate [%] | Zinc stannate [%] | Al hydroxide [%] | Al phosphate [%] | RP 605 [%] | UL 94 classification (1.6 mm) | LOI [% O$_2$] |
|---|---|---|---|---|---|---|---|---|---|---|
| 15 | | | 1 | | | | | | V-0 | 38 |
| 15 | | | | 1 | | | | | V-0 | |
| 15 | | | | | 2 | | | | V-0 | |
| 15 | | | | | | 1 | | | V-0 | 38.5 |
| 12 | | | | | | | 3 | | V-0 | 39.0 |
| 14 | | | | | | | | 1 | V-1 | 42.0 |
| | | 15 | | | | | | 3 | V-0 | 33.5 |

TABLE 5

Inventive. DEPAL combined with comounds effective in small amounts in glass-fiber-reinforced nylon-6 and nylon-6,6, respectively.

| Polymer | DEPAL [%] | Al phosphate [%] | Ceepree [%] | Securoc C [%] | Zinc borate [%] | Zinc oxide [%] | UL 94 classification (1.6 mm) | LOI [% O$_2$] |
|---|---|---|---|---|---|---|---|---|
| GR nylon-6 | 18 | 2 | | | | | V-0 | 40.0 |
| GR nylon-6 | 18 | | 2 | | | | V-1 | 35.0 |
| GR nylon-6 | 18 | | | 2 | | | V-1 | 45.0 |
| GR nylon-6 | 18 | | | | 2 | | V-0 | 37.0 |
| GR nylon-6 | 18 | | | | | 2 | V-0 | 37.0 |
| GR nylon-6,6 | 22 | 3 | | | | | V-1 | 41.0 |
| GR nylon-6,6 | 13.5 | | | | 1.5 | | V-1 | 36.5 |
| GR nylon-6,6 | 16 | | | | 4 | | V-0 | |

TABLE 6

Inventive. DEPAL combined with compounds effective in small amounts in ABS.

| DEPAL [%] | DHT-4A [%] | RP 605 [%] | Zinc borate [%] | Zinc oxide [%] | Zinc stannate [%] | UL 94 classification (1.6 mm) | LOI [% O$_2$] |
|---|---|---|---|---|---|---|---|
| 25 | 1 | | | | | V-1 | 38.5 |
| 13 | | 2 | | | | V-1 | 41.0 |
| 25 | | | 1 | | | V-1 | 40.0 |
| 25 | | | | 1 | | V-1 | 35.0 |
| 25 | | | | | 1 | V-1 | 47.0 |

TABLE 7

Inventive. DEPAL combined with nitrogen-containing compounds and compounds effective in small amounts in glass-fiber-reinforced PBT.

| DEPAL [%] | Melamine cyanurate [%] | Melamine [%] | Al phosphate [%] | Securoc C [%] | Zinc borate [%] | Zinc stannate [%] | UL 94 classification (1.6 mm) | LOI [% O$_2$] |
|---|---|---|---|---|---|---|---|---|
| 10 | 3 |   |   | 1 |   |   | V-0 | 36.0 |
| 10 | 4 |   |   |   | 1 |   | V-0 | 37.5 |
| 10 | 4 |   |   |   |   | 1 | V-0 | 35.0 |
| 9  |   | 4 | 2 |   |   |   | V-0 | 48.0 |

TABLE 8

Inventive. DEPAL combined with nitrogen-containing compounds and compounds effective in small amounts in glass-fiber-reinforced nylon.

| Polymer | DEPAL [%] | Melamine [%] | Melamine cyanurate [%] | Melamine phosphate [%] | Al phosphate [%] | Ceepree [%] | Zinc borate [%] | UL 94 classification (1.6 mm) | LOI [% O$_2$] |
|---|---|---|---|---|---|---|---|---|---|
| GR nylon-6   | 10 | 5   |    |   | 5 |   |     | V-0 | 34.0 |
| GR nylon-6   | 9  |     |    | 9 |   | 2 |     | V-0 | 27.0 |
| GR nylon-6,6 | 14 | 8.5 |    |   |   |   | 2.5 | V-0 | 36.0 |
| GR nylon-6,6 | 13 |     | 13 |   | 4 |   |     | V-0 | 33.5 |

What is claimed is:

1. A flame retardant combination for thermoplastic polymers comprises, as component A, a phosphinate of the formula (I) and/or a diphosphinate of the formula (II) and/or polymers of these

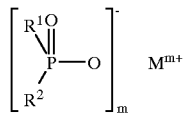

(I)

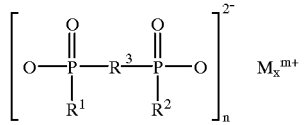

(II)

where
$R^1$ and $R^2$ are identical or different and are $C_1$–$C_8$-alkyl, and/or aryl;
$R^3$ is $C_1$–$C_{10}$-alkylene, $C_6$–$C_{10}$-arylene, -alkylarylene or -arylalkylene;
M are calcium ions, aluminum ions and/or zinc ions;
m is 2 or 3;
n is 1 or 3;
x is 1 or 2,
and, as component B, a synthetic inorganic compound and/or a mineral product selected from salts or esters of orthosilicic acid and condensation products thereof, silicates, zeolites, silicas, glass powders, glass-ceramic powders, ceramic powder, magnesium hydroxide, hydrotalcites, magnesium carbonates, magnesium calcium carbonates, zinc oxide, zinc stannate, zinc hydroxystannate, zinc phosphate, zinc borate, zinc sulfide, aluminum hydroxide, aluminum phosphate, red phosphorus, and metal carbonates of Be, Ca, Sr, Ba, and Ra.

2. The flame retardant combination as claimed in claim 1, wherein $R^1$ and $R^2$ are identical or different and are $C_1$–$C_6$-alkyl, and/or phenyl.

3. The flame retardant combination as claimed in claim 1, wherein $R^1$ and $R^2$ are identical or different and are methyl, ethyl, n-propyl, isopropyl, n-butyl, tert-butyl, n-pentyl and/or phenyl.

4. The flame retardant combination as claimed in claim 1, wherein $R^3$ is methylene, ethylene, n-propylene, isopropylene, n-butylene, tert-butylene, n-pentylene, n-octylene or n-dodecylene.

5. The flame retardant combination as claimed in claim 1, wherein $R^3$ is phenylene or naphthylene.

6. The flame retardant combination as claimed in claim 1, wherein $R^3$ is methylphenylene, ethylphenylene, tert-butylphenylene, methylnaphthylene, ethyinaphthylene or tert-butyinaphthylene.

7. The flame retardant combination as claimed in claim 1, wherein $R^3$ is phenylmethylene, phenylethylene, phenylpropylene or phenylbutylene.

8. The flame retardant combination as claimed in claim 1, which comprises nitrogen compounds, as further component C.

9. The flame retardant combination as claimed in claim 8, wherein the nitrogen compounds have the formulae (III) to (VIII) or are mixtures of these

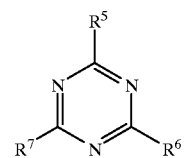

(III)

-continued

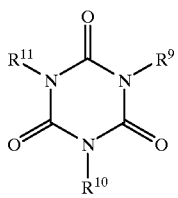
(IV)

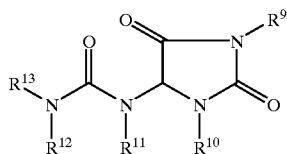
(V)

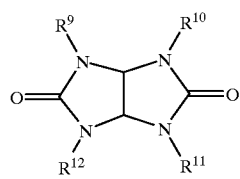
(VI)

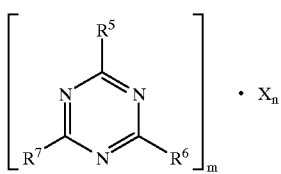
(VII)

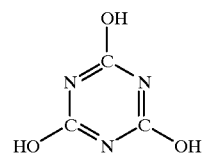
(VIII)

where
$R^5$ to $R^7$ are hydrogen, $C_1$–$C_8$-alkyl, $C_5$–$C_{16}$-cycloalkyl or -alkylcycloalkyl, unsubstituted or substituted with a hydroxyl function or with a $C_1$–$C_4$-hydroxyalkyl function, $C_2$–$C_8$-alkenyl, $C_1$–$C_8$-alkoxy, -acyl or -acyloxy, $C_6$–$C_{12}$-aryl or -arylalkyl, —$OR^8$ or —$N(R^8)R^9$, or else N-alicyclic or N-aromatic systems, $R^8$ is hydrogen, $C_1$–$C_8$-alkyl, $C_5$–$C_{16}$-cycloalkyl or -alkylcycloalkyl, unsubstituted or substituted with a hydroxyl function or with a $C_1$–$C_4$-hydroxyalkyl function, $C_2$–$C_8$-alkenyl, $C_1$–$C_8$-alkoxy, -acyl or -acyloxy, or $C_6$–$C_{12}$-aryl or -arylalkyl, $R^9$ to $R^{13}$ are groups identical with $R^8$ or else —O—$R^8$, m and n, independently of one another, are 1, 2, 3 or 4, X are acids which can form adducts with triazine compounds (III);

or the nitrogen compounds are esters of tris(hydroxyethyl) isocyanurate with aromatic polycarboxylic acids or are 6itrogen-containing phosphates of the formula $(NH_4)_y H_{3-y} PO_4$ or $(NH_4PO_3)_z$, where y is from 1 to 2 and z is from 1 to 10,000.

10. The flame retardant combination as claimed in claim 8, wherein component C is benzoguanamine, tris(hydroxyethyl) isocyanurate, allantoin, glycouril, melamine, melamine cyanurate, melamine phosphate, dimelamine phosphate and/or melamine pyrophosphate.

11. A process for rendering a thermoplastic polymer flame retardant, comprising incorporating a flame retardant combination A and B as claimed in claim 1 in a thermoplastic polymer.

12. The process as claimed in claim 11, wherein the thermoplastic polymers are HI (high-impact) polystyrene, polyphenylene ethers, polyamides, polyesters, polycarbonates or blends or polymer blends of ABS (acrylonitrile-butadiene-styrene) or PC/ABS (polycarbonate/acrylonitrile-butadiene-styrene).

13. The process as claimed in claim 11, wherein the thermoplastic polymers are polyamide, polyester or ABS.

14. The process as claimed in claim 11, wherein, independently of one another, component A is used at a concentration of from 1 to 30% by weight and component B at a concentration of from 0.1 to 10% by weight, based in each case on the composition of the thermoplastic polymer.

15. A flame-retardant plastic molding composition comprising a flame retardant combination as claimed in claim 1.

16. The flame-retardant plastic molding composition as claimed in claim 15, wherein the polymers are polyamide, polyester and/or ABS.

* * * * *